(12) United States Patent
Hamabe et al.

(10) Patent No.: US 7,106,712 B2
(45) Date of Patent: Sep. 12, 2006

(54) TRANSMISSION POWER CONTROL METHOD, TRANSMITTING AND RECEIVING APPARATUS, BASE STATION AND MOBILE STATION

(75) Inventors: Kojiro Hamabe, Tokyo (JP); Nahoko Takano, Tokyo (JP)

(73) Assignee: NEC Corporation, Tokyo (JP)

( * ) Notice: Subject to any disclaimer, the term of this patent is extended or adjusted under 35 U.S.C. 154(b) by 888 days.

(21) Appl. No.: 09/986,868

(22) Filed: Nov. 13, 2001

(65) Prior Publication Data

US 2002/0057666 A1    May 16, 2002

(30) Foreign Application Priority Data

Nov. 15, 2000   (JP)   ............................. 2000-347389

(51) Int. Cl.
*H04Q 7/00*    (2006.01)
(52) U.S. Cl. .................. 370/332; 370/282; 370/311; 370/333; 370/335; 370/347; 455/24; 455/424; 455/453; 455/522
(58) Field of Classification Search ................ 370/278, 370/282, 311, 332, 333, 334, 335, 347; 455/522, 455/424, 453, 24
See application file for complete search history.

(56) References Cited

U.S. PATENT DOCUMENTS 5,056,109 A    10/1991   Gilhousen et al.
5,790,527 A *  8/1998   Janky et al. ................ 370/330
6,567,670 B1 * 5/2003   Petersson ..................... 455/522

FOREIGN PATENT DOCUMENTS

| EP | 0 917 303 A1 | 5/1999 |
| JP | 8-181653 A | 7/1996 |
| JP | 10-51424 A | 2/1998 |
| JP | 2001-16166 A | 1/2001 |

* cited by examiner

*Primary Examiner*—Chi Pham
*Assistant Examiner*—Raj K. Jain
(74) *Attorney, Agent, or Firm*—Sughrue Mion, PLLC

(57) ABSTRACT

A transmission power control method and an apparatus, which includes a base station and a mobile stations, can lower a transmission power of a counterpart station and assure a communication quality, such as a desired bit error ratio, block error ratio, and so forth. A control reference value is set for generation of a control instruction controlling the transmission power of the counterpart station in a closed loop, when error correction coding and interleaving are used together. The transmission power control method includes steps of receiving a signal transmitted from a communication counterpart station, measuring a reception quality value of each received time slot, control instruction determining step of periodically determining a control instruction depending upon the reception quality values of the plurality of slots and transmitting the control instruction to the counterpart station, whereby the control instruction is used for transmission power control of the counterpart station.

14 Claims, 6 Drawing Sheets

FIG. 6

| FRAME NUMBER | 1 | | | | | | | | 2 | | | | | | | |
|---|---|---|---|---|---|---|---|---|---|---|---|---|---|---|---|---|
| SLOT NUMBER | 1 | 2 | 3 | 4 | 5 | 6 | 7 | 8 | 1 | 2 | 3 | 4 | 5 | 6 | 7 | 8 |
| UPON SLOT (1,1) RECEPTION | ○ | − | − | − | − | − | − | − | − | − | − | − | − | − | − | − |
| UPON SLOT (1,2) RECEPTION | ○ | ○ | − | − | − | − | − | − | − | − | − | − | − | − | − | − |
| . . . | . . . | | | | | | | | | | | | | | | |
| UPON SLOT (1,7) RECEPTION | ○ | ○ | ○ | ○ | ○ | ○ | ○ | − | − | − | − | − | − | − | − | − |
| UPON SLOT (1,8) RECEPTION | ○ | ○ | ○ | ○ | ○ | ○ | ○ | ○ | − | − | − | − | − | − | − | − |
| UPON SLOT (2,1) RECEPTION | ○ | ○ | ○ | ○ | ○ | ○ | ○ | ○ | ○ | − | − | − | − | − | − | − |
| UPON SLOT (2,2) RECEPTION | ○ | ○ | ○ | ○ | ○ | ○ | ○ | ○ | ○ | ○ | − | − | − | − | − | − |
| . . . | . . . | | | | | | | | | | | | | | | |
| UPON SLOT (2,7) RECEPTION | ○ | ○ | ○ | ○ | ○ | ○ | ○ | ○ | ○ | ○ | ○ | ○ | ○ | ○ | ○ | − |
| UPON SLOT (2,8) RECEPTION | ○ | ○ | ○ | ○ | ○ | ○ | ○ | ○ | ○ | ○ | ○ | ○ | ○ | ○ | ○ | ○ |

TRANSMISSION POWER CONTROL METHOD, TRANSMITTING AND RECEIVING APPARATUS, BASE STATION AND MOBILE STATION

BACKGROUND OF THE INVENTION

1. Field of the Invention

The present invention relates generally to a transmission power control method, a transmitting and receiving apparatus, a base station and a mobile station. More particularly, the invention relates a transmission power control method for controlling a transmission power in a base station and a mobile station in a radio communication system.

2. Description of the Related Art

In a code division multiplexing type mobile communication system, the same frequency is used by a plurality of channels. Therefore, a signal power of a certain channel becomes an interference power to jam other channels. Accordingly, in an up-link channel, in which signal is transmitted from a mobile station and received by the base station, if a signal power to be transmitted from the movable station becomes unnecessarily large, the interference power is increased to cause reduction of a channel capacity.

In order to prevent this, a closed loop type transmission power control is employed. In the closed loop type transmission power control in the up-link channel, the base station measures a reception quality value, such as a signal to interference power ratio, to transmit a control instruction for reducing a transmission power to the mobile station when the reception quality is excessively larger than a control reference value, and to transmit the control instruction for increasing the transmission power to the mobile station when the reception quality value is smaller than the control reference value. Then, the mobile station increases and decreases the transmission power in accordance with the control instruction.

Such transmission power control method has been discussed in detail in U.S. Pat. No. 5,056,109 to Gilhousen et al. for "Method and Apparatus for Controlling Transmission Power in a CDMA Cellular Mobile Telephone System".

On the other hand, in a down-link channel, the closed loop type transmission power control so that the reception quality value becomes the predetermined control reference value is performed to realize high channel capacity. In the closed loop type transmission power control in the down-link channel, the mobile station measures the reception quality value of the down-link channel to compare with a control reference value to transmit a control instruction for decreasing the transmission power to the base station when the reception quality value is smaller than the reference control value and to transmit the control instruction for increasing the transmission power to the base station when the reception quality value is larger than the reference control value. Then, the base station increases or decreases the transmission power according to the control instruction.

An information bit series to be transmitted and received between the base station and the mobile station is transmitted as divided per time slot (hereinafter simply referred to as slot) both in the up-link channel and in the down-link channel. Then, in the closed loop type transmission power control, the base station and the mobile station transmit the control instructions per slot and the counterpart station updates the transmission power at every occasion of reception of the control instructions. Assuming that the slot is a period about 1 msec, the control instructions are transmitted about thousands times per 1 second to control the transmission power at high speed to compensate fading fluctuation and maintain the reception quality value substantially constant.

However, when the mobile station moves at high speed, it becomes difficult to maintain reception quality constant even with the closed loop control due to high speed fluctuation of fading. On the other hand, it is also possible that the counterpart station erroneously receives the control instruction. Even in such case, reception quality cannot be maintained constant. Accordingly, in order to obtain desired bit error ratio even if the reception quality fluctuates in certain extent, it becomes necessary to set the control reference value in the closed loop type transmission power control at large value. As a result, the transmission power becomes large to decrease channel capacity.

Therefore, by providing error correction coding for the information bit series to perform transmission and reception between the base station and the mobile station, correcting the bit received in error can be realized even when reception error is caused in a part of bits due to instantaneous lowering drop of the reception quality value. Furthermore, a frame is consisted of a plurality of slots and interleaving is provided for exchanging order of the bit series to be transmitted back and forth in an interleaved block with taking one or more frames as the interleaved block.

By this, even if the reception quality value is lowered for a relatively long period to continuously receive bits in error, when the bits can be accurately received in a rate greater than a predetermined rate within the same interleaving block, substantially all bits can be received accurately by using with error correction coding. Thus, bit error ratio can be reduced and hence the reception error ratio of information block, namely block error ratio can be reduced.

Accordingly, for significant fading fluctuation, the block error ratio can be reduced even if the reception quality value cannot be maintained completely constant by the closed loop type transmission power control. Therefore, even if the control reference value is set at relatively small value, the transmission power can be reduced in certain extent with realizing the desired block error ratio.

However, in the conventional closed loop type transmission power control, when the error correction coding and interleaving are used together, the control reference value cannot be set at sufficiently small value to encounter a problem in that the transmission power cannot be reduced satisfactorily. The reason will be discussed as follow.

When the reception quality value is fluctuated due to fading fluctuation, if a ratio of a period, in which a reception quality value is lowered within each interleaving block, is less than or equal to the predetermined ratio, the block error ratio can be efficiently lowered by the error correction coding. However, in the conventional closed loop type transmission power control, the transmission power of the counterpart station is controlled by comparing the reception quality value per slot with the control reference value.

Therefore, in the already received slots in the same interleaving block, even if the slots having low reception quality value is large in number, the transmission power of the counterpart station can be reduced if the reception quality value of the finally received slot is greater than the control reference value. As a result, in the interleaving block, the ratio of the period where the reception quality value decreases becomes large to make probability larger to make it impossible to obtain the bit error ratio lowering effect due to error correction coding.

When the transmission power control, in which the reception quality value is controlled toward the predetermined control reference value per slot, is performed, fluctuation can be caused in a ratio of period to lower the reception quality value in each interleaving block. Therefore, setting the control reference value at relatively large value becomes necessary. Accordingly, even if both of the error correction coding and interleaving are used together, the reference control value becomes sufficiently small to make it impossible to make the transmission power sufficiently small.

SUMMARY OF THE INVENTION

It is an object of the present invention to provide a transmission power control method, a transmitting and receiving apparatus, a base station and a mobile station, which can lower a transmission power of a counterpart station with assuring a communication quality, such as a desired bit error ratio, block error ratio and so forth by setting a control reference value to be used for generation of a control instruction controlling the transmission power of the counterpart station in a closed loop type transmission power control, when an error correction coding and interleaving are used together.

According to the first aspect of the present invention, a transmission power control method comprises:

step of receiving a signal transmitted from a communication counterpart station;

step of measuring a reception quality value of each received time slot;

control instruction determining step of periodically determining a control instruction depending upon the reception quality values of the plurality of slots; and transmission step of transmitting the control instruction to the counterpart station, whereby the control instruction being used for transmission power control of the counterpart station.

In the preferred process, determination of the control instruction in the control instruction determining step and transmission of the control instruction in the transmission step may be performed per the time slot. The control instruction determining step may be to form the time slot group by a plurality of time slots and to determine the control instruction based on the reception quality values of the time slots contained in the time slot group on reception.

On the other hand, error correction coding process may be provided for information bit series of the signal transmitted from the counterpart station, the time slot group is consisted of a plurality of time slots to provide interleaving per the time slot group, and the control instruction determining step may determine the control instruction based on the reception quality values of the time slots contained in the time slot group on reception.

The control instruction determining step may comprises step of comparing one of a median value of the reception quality values of slots contained in the time slot group on reception, X % value wherein X is a value in a range from 0 to 100 or an average value with a first control reference value and step of determining the control instruction based on the result of comparison. Also, the transmission power control method may further comprise step of checking presence or absence of error of received signal, and the first control reference value is varied depending upon detected error.

The control instruction determining step may include step of increasing the transmission power of the counterpart station when the reception quality value of the time slot measured per reception of the time slot is smaller than a second control reference value.

The control instruction determining step may include step of decreasing the transmission power of the counterpart station when the reception quality value of the time slot measured per reception of the time slot is greater than a third control reference value.

According to the second aspect of the present invention, a transmission power control method in a communication system, in which error correction coding process is provided for information bit series of a signal transmitted from a communication counterpart station and a frame is consisted of a plurality of time slots, comprises:

step of measuring a reception quality value of the time slot per reception of the time slot from the counterpart station; and step of transmitting a control instruction for increasing a transmission power of the counterpart station when a median value of the reception quality values of slots contained in the time slot group on reception, X % value wherein X is a value in a range from 0 to 100 or an average value is smaller than a first control reference value, and transmitting the control instruction for decreasing the transmission power of the counterpart station otherwise, whereby the control instruction is used for transmission power control for the counterpart station.

According to the third aspect of the present invention, a transmission power control method in a communication system, in which error correction coding process is provided for information bit series of a signal transmitted from a communication counterpart station and a frame is consisted of a plurality of time slots, and interleaving is provided per the interleaved block, comprises:

step of measuring a reception quality value of the time slot per reception of the time slot from the counterpart station; and step of transmitting a control instruction for increasing a transmission power of the counterpart station when a median value or average value of the reception quality values of slots contained in the time slot group on reception is smaller than a first control reference value, and transmitting the control instruction for decreasing the transmission power of the counterpart station otherwise, whereby the control instruction is used for transmission power control for the counterpart station.

According to the fourth aspect of the present invention, a transmitting and receiving apparatus comprises:

receiving means for receiving a signal transmitted from a communication counterpart station;

measuring means for measuring a reception quality value of each received time slot;

control instruction determining means for periodically determining a control instruction depending upon the reception quality values of the plurality of slots; and transmitting means for transmitting the control instruction to the counterpart station for use in transmission power control of the counterpart station.

The control instruction determining means may perform determination of the control instruction per time slot, and the transmitting means may performs transmission of the control instruction per the time slot. Also, the control instruction determining means may form the time slot group by a plurality of time slots and to determine the control instruction based on the reception quality values of the time slots contained in the time slot group on reception.

The control instruction determining means may form a time slot group per an interleaved block as interleaved unit in the counterpart station and determines the control instruction based on the reception quality values of the time slots contained in the time slot group on reception. Also, the control instruction determining means may compare one of a median value of the reception quality values of slots contained in the time slot group on reception, X % value wherein X is a value in a range from 0 to 100 or an average value with a first control reference value and determines the control instruction based on the result of comparison.

Also, the transmitting and receiving apparatus may further comprises:

means for checking presence or absence of error of received signal, and means for varying the first control reference value depending upon detected error.

The control instruction determining means may increase the transmission power of the counterpart station when the reception quality value of the time slot measured per reception of the time slot is smaller than a second control reference value. The control instruction determining means may decrease the transmission power of the counterpart station when the reception quality value of the time slot measured per reception of the time slot is greater than a third control reference value.

According to the fifth aspect of the present invention, a transmitting and receiving apparatus comprises:

means for measuring a reception quality value of the time slot per reception of the time slot from the counterpart station; and means for transmitting a control instruction for increasing a transmission power of the counterpart station when a median value of the reception quality values of slots contained in the time slot group on reception, X % value wherein X is a value in a range from 0 to 100 or an average value is smaller than a first control reference value, and transmitting the control instruction for decreasing the transmission power of the counterpart station otherwise.

According to the sixth aspect of the present invention, a transmitting and receiving apparatus comprises:

means for measuring a reception quality value of the time slot per reception of the time slot from the counterpart station; and means for transmitting a control instruction for increasing a transmission power of the counterpart station when a median value or average value of the reception quality values of slots contained in the time slot group on reception is smaller than a first control reference value, and transmitting the control instruction for decreasing the transmission power of the counterpart station otherwise.

With the present invention, a base station and a mobile station having the transmitting and receiving apparatus set forth above, can be obtained.

With the function of the present invention, upon reception of the slot from the counterpart station, the reception quality value of the slot is measured to transmit the control instruction to the counterpart station for increasing the transmission power of the counterpart station when the median value or the average value of the reception quality values of the slots contained in the interleaved block on reception is smaller than the predetermined control reference value, and otherwise, to transmit the control instruction to the counterpart station for decreasing the transmission power of the counterpart station, so that the control instruction is used in the transmission power control in the counterpart station.

Therefore, in the closed loop type transmission power control of the mobile communication system using the error correction coding and the interleaving, when the control instruction for controlling the transmission power of the counterpart station is determined, the desired block error ratio may be obtained even when the control reference value to be compared with the reception quality value is set at small value to permit lowering of the transmission power in the counterpart station.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 6 is an explanatory table showing slots to be objective for deriving a median value of reception quality values in the first embodiment.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
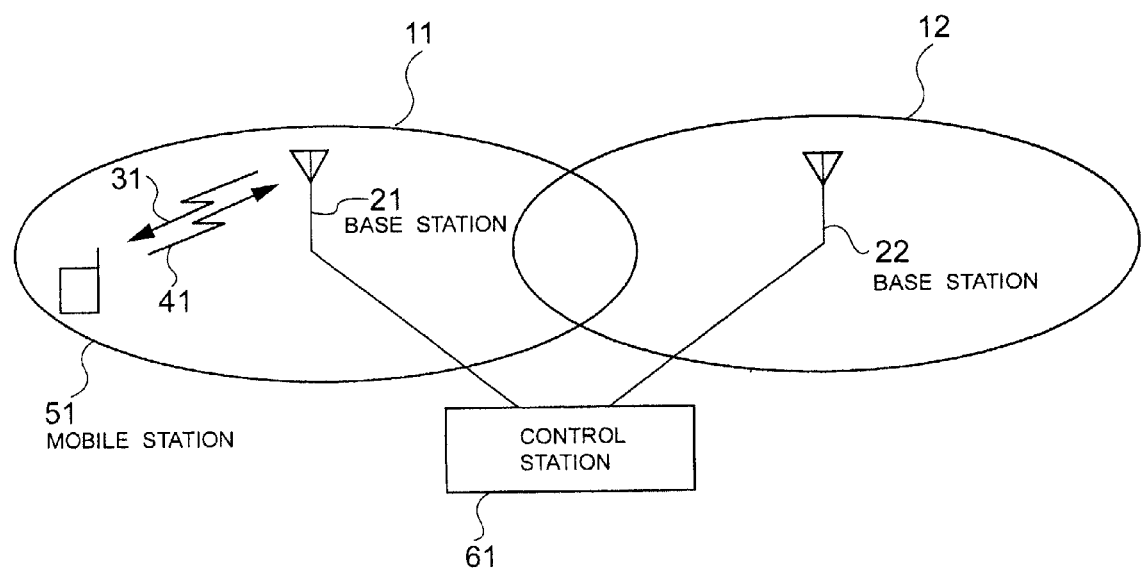
FIG. 1 is a block diagram showing a mobile communication system, in which the present invention is implemented.

The first embodiment of a transmission power control method and a transmitting and receiving apparatus are implemented in a mobile communication system employing a construction shown in FIG. 1. In the mobile communication system of FIG. 1, a service area is divided into a plurality of cells 11 and 12. In the cells 11 and 12, respective base stations 21 and 22 are arranged. In the cell 11, a mobile station 51 is present. The base stations 21 and 22 are respectively connected to a control station 61. The control station 61 is, in turn, connected to a communication network (not shown) comprising other control station.

It should be noted, while not illustrated, that the shown mobile communication system has large number of other base stations and a large number of mobile stations in each cell. This mobile communication system employs a code division multiplexing system as a radio access system.

Figure 2:
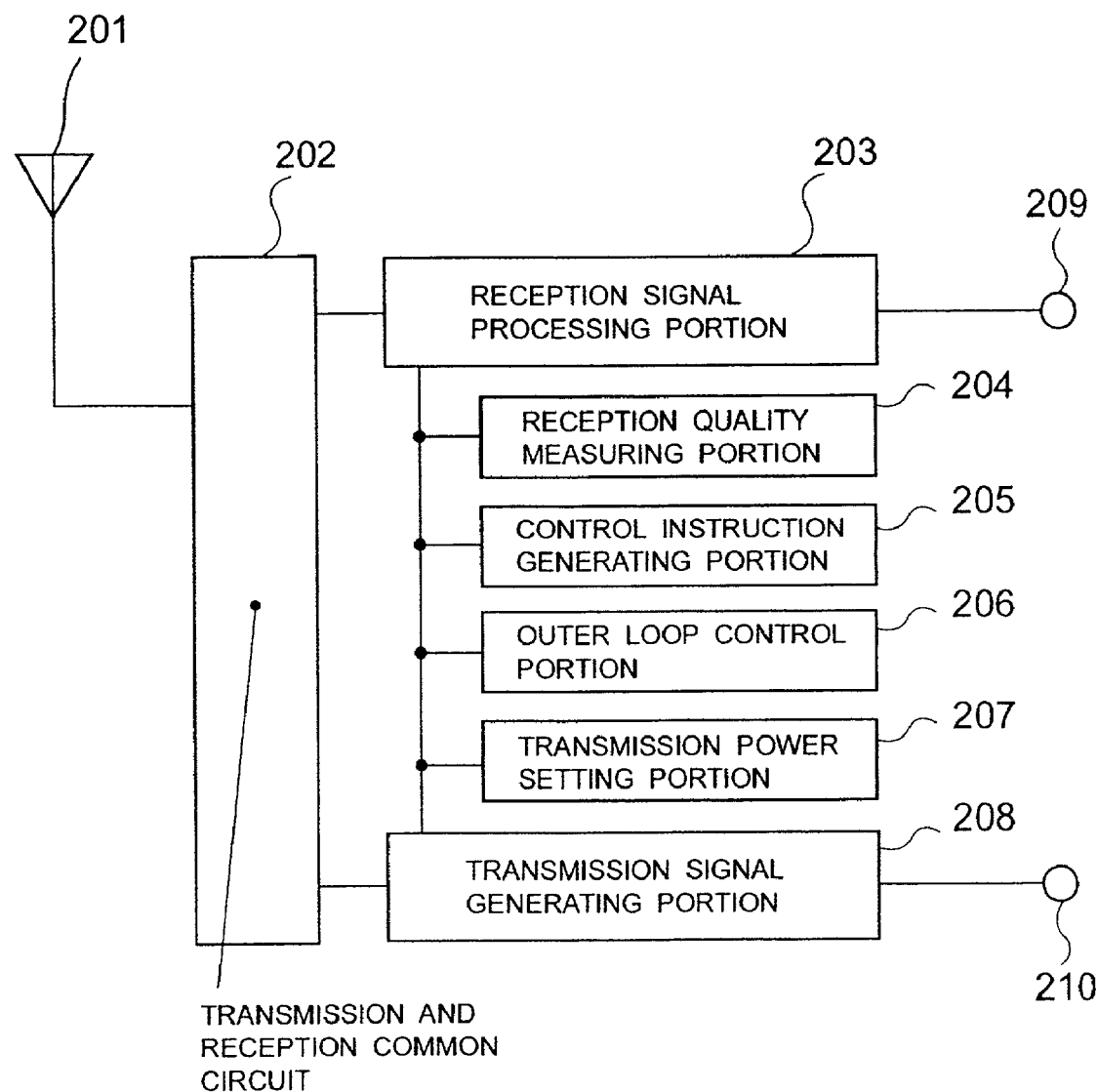
FIG. 2 is an illustration showing an example of a construction of a transmitting and a receiving apparatus according to the present invention.

Both of the base stations 21 and 22 and the mobile station 51 have transmitting and receiving apparatus. FIG. 2 shows an example of construction of the transmitting and receiving apparatus in FIG. 2. The transmitting and receiving apparatus is constructed with an antenna 201, a transmission and reception common circuit 202, a reception signal processing portion 203, a reception quality measuring portion 204, a control instruction generating portion 205, an outer loop control portion 206, a transmission power setting portion

207, a transmission signal generating portion 208, a reception circuit output terminal 209 and a transmission circuit output terminal 210. For performing transmission and reception with a large number of mobile stations, the base station has a large number of transmitting and receiving devices. The basic construction of each transmitting and receiving device in the base station is the same as the transmitting and receiving device of the mobile station.

Figure 3:
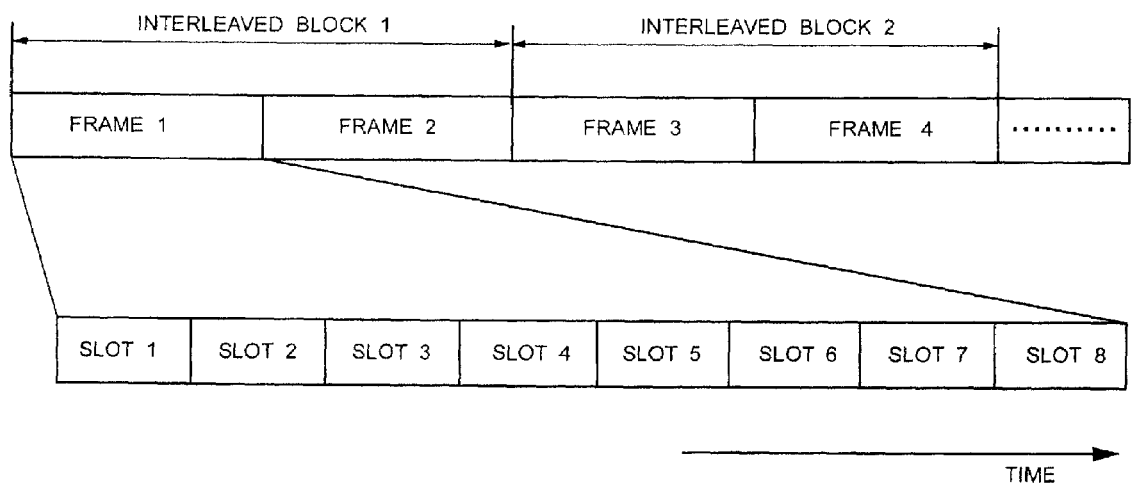
FIG. 3 is a diagrammatical chart showing a frame construction of a transmission signal.

FIG. 3 shows a frame construction of a transmission signal. As shown in FIG. 3, both of a signal 31 of a down-link and a signal 41 of an up-link are constructed with repetition of a frame having a predetermined length of period. Each frame is constructed with a plurality of slots of further shorter period. On the other hand, an interleaving block is set per one or more frames. In an example of FIG. 2, each frame is constructed with eight slots. Moreover, the interleaving block is constructed with two frames. Accordingly, each interleaving block is a slot group consisted of sixteen slots. Interleaving is provided per the slot group consisted of sixteen slots.

On the other hand, in each slot, a pilot signal for measuring reception quality is included. Furthermore, in each slot in the down-link, the control instruction for controlling the transmission power of the up-link is included. In each slot in the up-link, the control instruction for controlling the transmission power in the down-link is included.

The transmitting and receiving devices included in the base station and the mobile station divide a transmitting information bit series into information blocks each having a predetermined bit number to add a CRC (Cyclic Redundancy Check) code as an error detection code per information block to provide error correction coding, such as convolution coding. Then, the bit series is divided per predetermined bit number which can be transmitted within one frame. Furthermore, since the interleaving block is consisted of two frames, interleaving to changing transmission order in back and forth direction according to a predetermined rule per bit series of two frames, is performed. The interleaved bit series is divided into eight segments. One segment and control instruction of the transmission power generated and notified by a control instruction generating portion 205 are inserted in each slot to generate a transmission signal with modulation and frequency conversion.

Then, depending upon a transmission power setting value notified by a transmission power setting portion 207, the transmission signal is amplified to transmit to the counterpart station from the antenna 201 through the transmission and reception common circuit 202. Here, the counterpart station of the base station is the mobile station and the counterpart station of the mobile station is the base station.

On the other hand, the transmitting and receiving devices provided in the base station and the mobile station receive the transmission signal transmitted from the counterpart station by the antenna 201 to feed to the reception signal processing portion 203 via the transmission and reception common circuit 202. In the reception signal processing portion 203, whenever eight slots of each frame except for the control instruction of the transmission power of each slot are received, segmented bit series is taken and coupled to perform reverse process of interleaving provided in the counterpart station. Then, by further providing the error correction decoding, the information block is obtained. By using the CRC code contained per information block, presence or absence of error is detected per information block. Then, the detected information is notified to the outer loop control portion 206.

In the outer loop control portion 206, a first control reference value to be used upon determination of a transmission power value in the transmission power setting portion, is determined. More particularly, at start timing of transmission and reception, a predetermined initial value is set as the first control reference value. After initiation of transmission and reception, by using information of presence or absence of error per the information block notified from the reception signal processing portion, a block error ratio is calculated per a predetermined time zone. When the block error ratio is greater than a predetermined quality target value, the first control reference value is increased by a predetermined value, and otherwise, the first control reference value is decreased by the predetermined value.

On the other hand, in the reception signal processing portion 203, whenever the slot from the counterpart station is received, the control instruction of the transmission power included in the slot is notified to the transmission power setting portion 207. In the transmission signal setting portion 207, when the notified control instruction commands for increasing of power, the transmission power setting value is increased by a predetermined value. Conversely, when the notified control instruction commands decreasing of the power, the transmission power setting value is decreased by the predetermined value. Then, the transmission power setting value is notified to the transmission signal generating portion 208.

The reception quality measuring portion 204 measures reception quality of the slot using the pilot signal contained in the slot whenever the slot from the counterpart station is received. Then, together with a frame number containing the slot, on which the reception quality is measured, the reception quality value is notified to the control instruction generating portion 205. As the reception quality value, a SIR (signal to interference power ratio) of the pilot signal is calculated.

Figure 4:
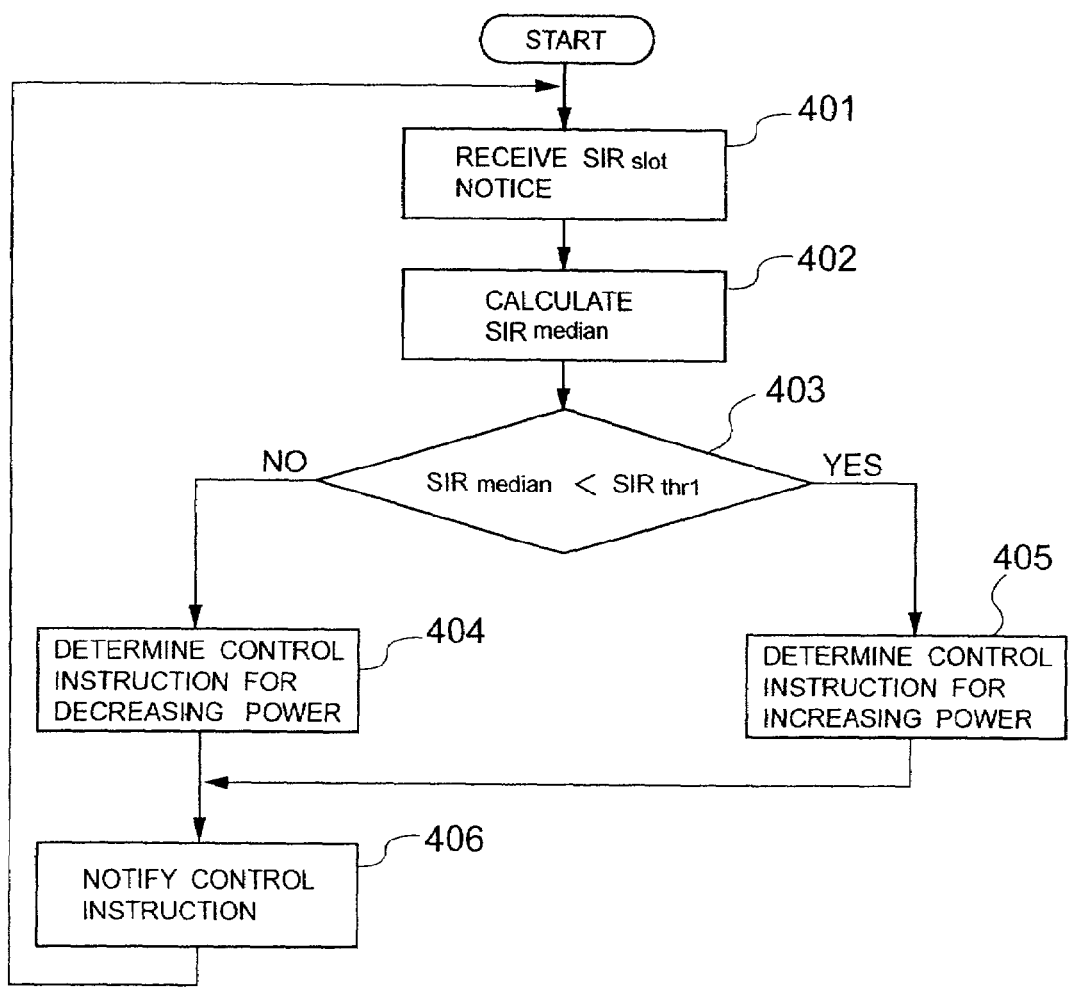
FIG. 4 is a flowchart showing a generation method of a control instruction of a transmission power in the first embodiment.

Next, a generation method of the control instruction in the control instruction generating portion 205 will be discussed with reference to a flowchart in FIG. 4. The control instruction generating portion 205 receives a notification of the reception quality value $SIR_{slot}$ of the slot from the reception quality measuring portion 204 together with information of the frame number containing the slot in question, at step 401.

Next, at step 402, a median value $SIR_{median}$ of the reception quality values $SIR_{slot}$ of the received slots among slots contained in the interleaved block to which the slot belongs is derived. Here, the median value is the value located at the center when the reception quality values $SIR_{slot}$ are arranged in descending order or an average value of two values at the center when number of the reception quality values $SIR_{slot}$ is even number.

As shown in FIG. 3, the interleaved block is constructed with two frames and is consisted of a frame of odd number of a frame of even number next to the former odd number. Accordingly, when the frame number to be notified together with the reception quality value is odd number, the median value is calculated with taking the reception quality values of the slots having the same frame number. On the other hand, when the frame number to be notified together with the reception quality value is even number, the median value is calculated with taking the slots in the same frame number and one preceding frame number.

FIG. 6 shows the slot to be object for deriving the median value of the reception quality values upon reception of each slot. In FIG. 6, the slot (f, s) means the slot of frame number f and slot number s. White circles mean that the relevant slots are objects for calculation of the median value. As shown in FIG. 6, for example, upon reception of the slot (1, 7), the reception quality values of seven slots precedingly received are objects for calculation of the median value. On the other hand, upon reception of the slot (2, 8), including the slots in one preceding frame, seventeen slots become objects for calculation of the median value of the reception quality value.

Next, at step 403, the median value $SIR_{median}$ the reception quality values is compared with the first control reference value $SIR_{thr1}$. When the median value $SIR_{median}$ is smaller than the first control reference value $SIR_{thr1}$, the control instruction is determined for increasing power (step 405). Otherwise, the control instruction is determined for decreasing the power (step 404). Then, at step 406, the generated control instruction is notified to the transmission signal generating portion 208 to repeat the process from step 401.

The control instruction thus notified to the transmission signal generating portion 208 is transmitted to the counterpart station to be used for controlling the transmission power of the counterpart station. Particularly, as already discussed, in the transmitting and receiving device of the counterpart station, the transmission power setting portion 207 notifies the transmission power setting value increased or decreased depending upon the control instruction to the transmission signal generating portion 208. In the transmission signal generating portion 208, the transmission signal is amplified depending upon the transmission power setting value.

In the shown embodiment, the control instruction is generated depending upon the median value of the reception quality value of the already received slots in the same interleaving block to make fluctuation of the median value of the reception quality values for controlling the transmission power of the counterpart station.

For instance, when the median value of the reception quality values $SIR_{slot}$ of the slots already received slots in the same interleaved block is smaller than the first control reference value $SIR_{thr1}$, the transmission power of the counterpart station is increased. For this purpose, when proportion of the already received slots having the reception quality value $SIR_{slot}$ smaller than the control reference value $SIR_{thr1}$ is large, the transmission power of the counterpart station is increased even if the reception quality value $SIR_{slot}$ of the last received slot is larger than the control reference value. Accordingly, in the interleaved block, even if the reception quality value is fluctuated significantly due to fading fluctuation, probability of occurrence of the reception quality value smaller than the control reference value becomes low to make the proportion of the ratio of the period where the reception quality becomes smaller than the control reference value low to be closer to 50%.

On the other hand, conversely to the above, when the median value of the reception quality values $SIR_{slot}$ of the slots already received slots in the same interleaved block is larger than the control reference value $SIR_{thr1}$, the transmission power of the counterpart station is decreased. Therefore, when number of slots having the reception quality value $SIR_{slot}$ smaller than the control reference value $SIR_{thr1}$ is small among the slots already received in the same interleaved block, the transmission power is decreased even if the reception quality value of the last received slot is smaller than the control reference value. Accordingly, in the interleaved block, probability of occurrence of the reception quality value smaller than the control reference value becomes high to make the proportion of the ratio of the period where the reception quality becomes smaller than the control reference value low to be closer to 50%. In this case, if there is a margin in the median value of the reception quality values of the slots in the same interleaved block, the transmission power of the counterpart station is decreased to minimize transmission power of the counterpart station.

As a result, even of the reception quality value is fluctuated due to fading fluctuation, the ratio of the period where the reception quality is smaller than the control reference value can be maintained substantially constant with minimizing the transmission power in the counterpart station to make fluctuation of the median value of the reception quality values per interleaved block small. Therefore, probability of increasing of the ratio of the period where the reception quality values become smaller than the control reference value, can be maintained low to attain effect of reducing the bit error ratio by the error correction coding. Therefore, the control reference value can be set at smaller value with realizing the desired block error ratio by an outer loop to reduce transmission power of the counterpart station.

Next, discussion will be given for the second embodiment of the transmission power control method and the transmitting and receiving apparatus. In the first embodiment of the transmission power control method and the transmitting and receiving apparatus, the median value, namely 50% value, of the reception quality values of the slots contained in the same interleaved block was calculated. In contrast to this, in the second embodiment of the transmission power control method and the transmitting and receiving apparatus, with setting X as a numerical value in a range of 0 to 100, X % value is calculated in stead of the median value. For instance, by setting X as 30, 30% value is calculated to compare with the control reference value to generate the control instruction of the transmission power.

Other points are all the same as the first embodiment. With such construction, the control reference value can be set smaller in the identical manner as the first embodiment to reduce transmission power of the counterpart station.

Next, discussion will be given for the third embodiment of the transmission power control method and the transmitting and receiving apparatus. In the first embodiment of the transmission power control method and the transmitting and receiving apparatus, the median value of the reception quality values of the slots contained in the same interleaved block was calculated. In contrast to this, in the third embodiment of the transmission power control method and the transmitting and receiving apparatus, an average value is calculated in stead of the median value. The average value is compared with the control reference value to generate the control instruction of the transmission power. Other points are all the same as the first embodiment.

Even with such construction, since the median value and the average value have positive correlation, the control reference value can be set smaller in the identical manner as the first embodiment to reduce transmission power of the counterpart station.

Next, discussion will be given for the fourth embodiment of the transmission power control method and the transmitting and receiving apparatus. In the first embodiment of the transmission power control method and the transmitting receiving apparatus, the median value of the reception quality values of the slots contained in the same interleaved block was calculated. In contrast to this, in the forth embodiment of the transmission power control method and the transmitting and receiving apparatus, a median value of the reception quality values of the slots contained in the same frame is calculated. For this purpose, in the control instruction generating portion 205 of the transmitting and receiving apparatus, irrespective whether the frame number notified together with the reception quality value is odd number or even number, the median value is calculated with taking only slots in the same frame as objects, at the step 402 in FIG. 4. Other points are all the same as the first embodiment.

With such construction, fluctuation of the median value of the reception quality values per frame may be smaller so that fluctuation of the median values of the reception quality values of each interleaved block consisted of a plurality of frames also become smaller. Accordingly, the control reference value can be set smaller similarly to the first embodiment to reduce transmission power of the counterpart station. Furthermore, upon calculating the median value of the reception quality value, it becomes unnecessary to consider the frames belonging to the same interleaved block to facilitate calculation of the median value of the reception quality values.

Next, discussion will be given for the fifth embodiment of the transmission power control method and the transmitting and receiving apparatus. In the fifth embodiment of the transmission power control method and the transmitting receiving apparatus, only method of generating the control instruction by the control instruction generating portion of the transmitting and receiving apparatus is different from the first embodiment, and other points are all the same as the first embodiment.

Figure 5:
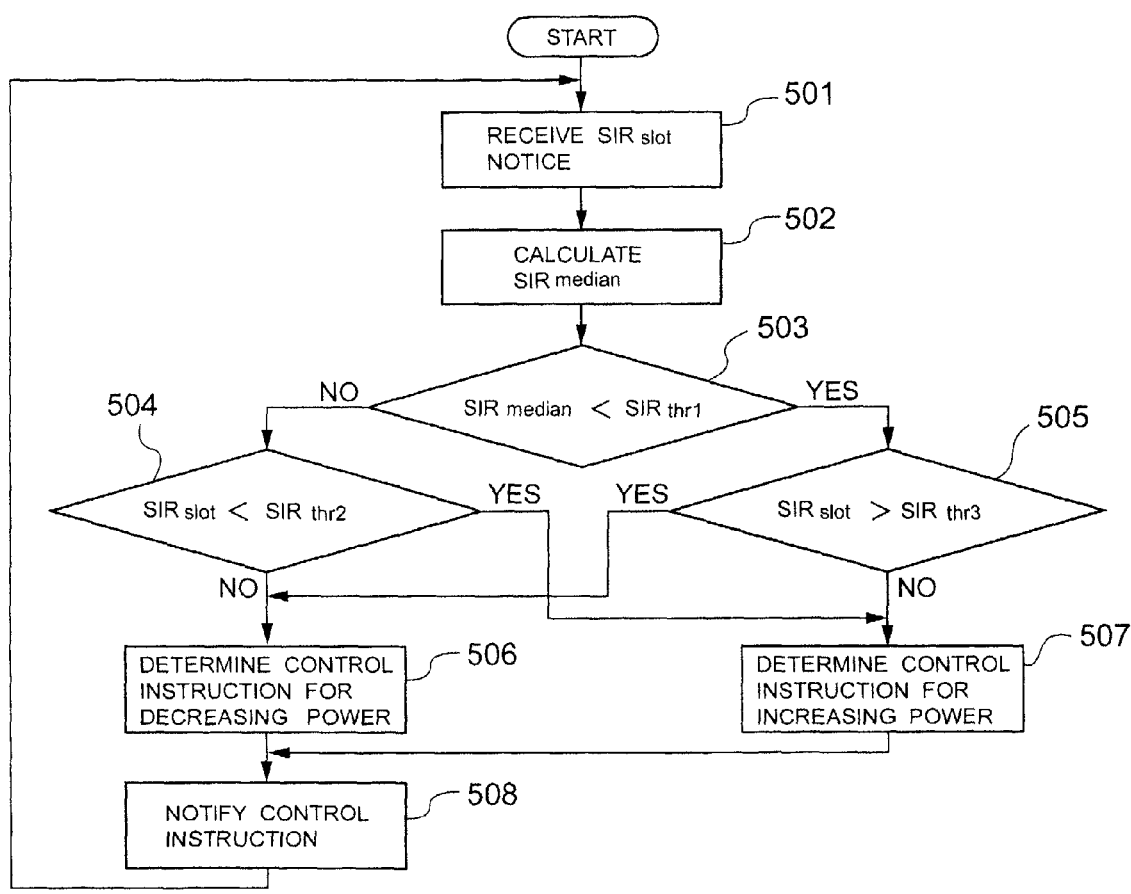
FIG. 5 is a flowchart showing a generation method of a control instruction of a transmission power in the fifth embodiment.

FIG. 5 is a flowchart showing a method for generating the control instruction by the control instruction generating portion 205 fifth embodiment of the transmitting and receiving apparatus. At first, the control instruction generating portion 205 receives notification of the reception quality value $SIR_{slot}$ of the slot from the reception quality measuring portion 204 together with the information of the frame number containing the slot, at step 501. Next, at step 502, among the slots contained in the interleaved block containing the slot, the median value $SIR_{median}$ of the reception quality values $SIR_{slot}$ of the already received slots is derived.

Then, at step 503, the median value $SIR_{median}$ of the reception quality value is compared with the first control reference value $SIR_{thr1}$. Here, as the first control reference value, a value determined by the outer loop control portion 206 is used. The median value $SIR_{median}$ is not smaller than the first control reference value $SIR_{thr1}$, the reception quality value $SIR_{slot}$ of the finally received slot is compared with the second control reference value, at step 504.

Here, when the second control reference value is set at smaller value than the first control reference value by a predetermined value and the first control reference value is updated by the outer loop control portion, the second control reference value is also updated similarly. When the reception quality value $SIR_{slot}$ of the finally received slot is smaller than the second control reference value, the control instruction is determined to increase the power (step 507), and otherwise, the control instruction is determined to decrease the power (step 506).

On the other hand, in the step 503, the median value $SIR_{median}$ is smaller than the first control reference value $SIR_{thr1}$, the reception quality value $SIR_{slot}$ of the finally received slot is compared with the third control reference value at step 505. Here, the third control value is set at a value greater than the first control reference value by a predetermined value. When the first control reference value is updated by the outer loop portion, the third control reference value is also updated similarly.

The reception quality value $SIR_{slot}$ of the finally received slot is greater than the third control reference value, the control instruction is determined to decrease the power (step 506), and otherwise, the control instruction is determined to increase the power (step 507). Then, at step 508, the generated control instruction is notified to the transmission signal generating portion 208. Then, the process is repeated from step 501.

In the shown embodiment, similarly to the first embodiment, even if the reception quality value is fluctuated due to fading fluctuation, fluctuation of the median value of the reception quality values of the slots contained in the same interleaved block becomes small to permit setting of the control reference value at smaller value with realizing the desired block error ratio and thus to reduce the transmission power in the counterpart station.

Also, even when the median value $SIR_{median}$ is greater than the first control reference value $SIR_{thr1}$, when the reception quality value $SIR_{slot}$ of the finally received slot is smaller than the second control reference value, the control instruction is determined to increase the power to prevent lowering of reception quality upon reception of the control instruction for the transmission power transmitted from the counterpart station per slot. Therefore, control of the transmission power can be performed more accurately by the control instruction for the transmission power from the counterpart station.

Furthermore, even when the median value $SIR_{median}$ is smaller than the first control reference value $SIR_{thr1}$, when the reception quality value $SIR_{slot}$ of the finally received slot is greater than the third control reference value, the control instruction is determined to decrease the power to prevent the transmission power from becoming excessive. Therefore, increasing of the transmission power from the counterpart station can be suppressed to lower interference power to other channels.

On the other hand, in the final slot of the interleaved block, when the reception quality value becomes excessively small, even in the slots in the front half of the next interleaved block, the reception quality values become small. Thus, the median value also becomes small. Therefore, in the slots in the rear half, the median value can be made close to the first control reference value to make the transmission power of the counterpart station large to make the reception quality value large. As a result, the final slot of the interleaved block, the reception quality value becomes excessively large. Furthermore, in the next interleaved block, the median value of the reception quality values of the slots in the front half becomes large, the reception quality values of the slots in the rear half can be small.

In such case, the transmission power of the counterpart station can fluctuate significantly to increase the average value of the transmission power and thus to increase the interference power. However, in the shown embodiment, since the reception quality value of each slot is controlled so as not to be smaller than the second control reference value, the reception quality value may not become excessively small. On the other hand, since the reception quality value of each slot is controlled so as not to exceed the third control reference value, significant fluctuation of the transmission power can be prevented to reduce average value of the transmission power.

In the fifth embodiment, by comparing the median value of the reception quality values of the slots contained in the interleaved block with the control reference value, the control instruction of the transmission power is generated. However, it is also possible to take X as a value in a range from 0 to 100 to calculate the value of X % to use in place of the median value. On the other hand, the average value may be derived and used in place of the median value. On the other hand, it is further possible to derive the median value of the reception quality values of the slots contained in the same frame to use in place of the median value of the reception quality values of the slots in the interleaved block.

As set forth above, upon reception of the slot from the counterpart station, the reception quality value of the slot is measured to transmit the control instruction to the counterpart station for increasing the transmission power of the counterpart station when the median value, X % value or the average value of the reception quality value of the slot contained in the interleaved block on reception is smaller than the predetermined control reference value, and otherwise, to transmit the control instructions to the counterpart station for decreasing the transmission power of the counterpart station, so that the control instruction is used in the transmission power control in the counterpart station. Therefore, in the closed loop type transmission power control of the mobile communication system using the error correction coding and the interleaving, the desired block error ratio may be obtained even when the control reference value to be compared with the reception quality value is set at small value to permit lowering of the transmission power in the counterpart station.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

For instance, in the embodiments, as a method to compare the median value of a plurality of slots with the control reference value, at every occasion of reception of the slots contained in the same interleaved block, the reception quality value $SIR_{slot}$ is compared with the control reference value. Also, number of slots, in which the reception quality values $SIR_{slot}$ are greater, and number of slots, in which the control reference value is greater, are counted to be compared those numbers. If the number of slots, in which the reception quality values $SIR_{slot}$ are greater, is greater, judgment is made that the median value is greater than the control reference value. If the number of slots, in which the reception quality values $SIR_{slot}$ are greater, is smaller, judgment is made that the median value is smaller than the control reference value.

On the other hand, it is also possible to calculate a difference between the number of slots, in which the reception quality values $SIR_{slot}$ are greater, and the number of slots, in which the control reference value is greater to male similar judgment.

On the other hand, the control instruction to be generated upon reception of the final slot of the interleaved block is used for controlling the transmission power of the slots contained in the next interleaved block. Therefore, it is further possible to determine the control instruction by comparing only reception quality value of the final slot with the control reference value without calculating the median value.

What is claimed is:

1. A transmission power control method, comprising:
   step for receiving a signal transmitted from a communication counterpart station;
   step for measuring a reception quality value of each received time slot;
   control instruction determining step for, in a periodicity shorter than a predetermined interleaved block period, determining a control instruction depending upon said reception quality values of time slots that have already been received in a predetermined interleaved block; and
   transmission step for transmitting said control instruction to said counterpart station,
   whereby said control instruction being used for transmission power control of said counterpart station,
   wherein error correction coding process is provided for information bit series of the signal transmitted from said counterpart station, the interleaved block is consisted of a plurality of time slots to provide interleaving per said interleaved block, and
   said control instruction determining step determines said control instruction based on the reception quality values of the time slots contained in the time slot group on reception.

2. A transmission power control method as set forth in claim 1, wherein said control instruction determining step is to form said time slot group by a plurality of time slots and to determine said control instruction based on the reception quality values of the time slots contained in said time slot group on reception.

3. A transmission power control method as set forth in claim 2, wherein said control instruction determining step comprises:
   step for comparing one of a median value of the reception quality values of slots contained in the time slot group on reception, X % value wherein X is a value in a range from 0 to 100 or an average value with a first control reference value, and
   step for determining said control instruction based on the result of comparison.

4. A transmission power control method as set forth in claim 3, which further comprises:
   step of checking presence or absence of error of received signal, and said first control reference value is varied depending upon detected error.

5. A transmission power control method as set forth in claim 1, wherein said control instruction determining step includes step for increasing the transmission power of the counterpart station when the reception quality value of the time slot measured per reception of said time slot is smaller than a second control reference value.

6. A transmission power control method as set forth in claim 1, wherein said control instruction determining step includes step for decreasing the transmission power of the counterpart station when the reception quality value of the time slot measured per reception of said time slot is greater than a third control reference value.

7. A transmitting and receiving apparatus, comprising:
   receiving means for receiving a signal transmitted from a communication counterpart station;
   measuring means for measuring a reception quality value of each received time slot;
   control instruction determining means for, in a periodicity shorter than a pre-determined interleaved block period, determining a control instruction depending upon said reception quality values of time slots that have already been received in a pre-determined interleaved block; and
   transmitting means for transmitting said control instruction to said counterpart station for use in transmission power control of said counterpart station, wherein error correction coding means are provided for information bit series of the signal transmitted from said counterpart station, wherein said control instruction determining means forms a time slot group per an interleaved block as an interleaved unit in the counterpart station and determines said control instruction based on the reception quality values of the time slots contained in the time slot group on reception.

8. A transmitting and receiving apparatus as set forth in claim 7, wherein said control instruction determining means forms said time slot group by a plurality of time slots and to determine said control instruction based on the reception quality values of the time slots contained in said time slot group on reception.

9. A transmitting and receiving apparatus as set forth in claim 7, wherein said control instruction determining means compares one of a median value of the reception quality values of slots contained in the time slot group on reception, X % value wherein X is a value in a range from 0 to 100 or an average value with a first control reference value and determines said control instruction based on the result of comparison.

10. A transmitting and receiving apparatus as set forth in claim 9, which further comprises:

means for checking presence or absence of error of received signal, and means for varying said first control reference value depending upon detected error.

11. A transmitting and receiving apparatus as set forth in claim 7, wherein said control instruction determining means increases the transmission power of the counterpart station when the reception quality value of the time slot measured per reception of said time slot is smaller than a second control reference value.

12. A transmitting and receiving apparatus as set forth in claim 7, wherein said control instruction determining means decreases the transmission power of the counterpart station when the reception quality value of the time slot measured per reception of said time slot is greater than a third control reference value.

13. A base station including a transmitting and receiving apparatus defined in claim 7.

14. A mobile station including a transmitting and receiving apparatus defined in claim 7.

* * * * *